J. M. Canterbury.
Field-Marker
N° 74302  Patented Feb. 11, 1868
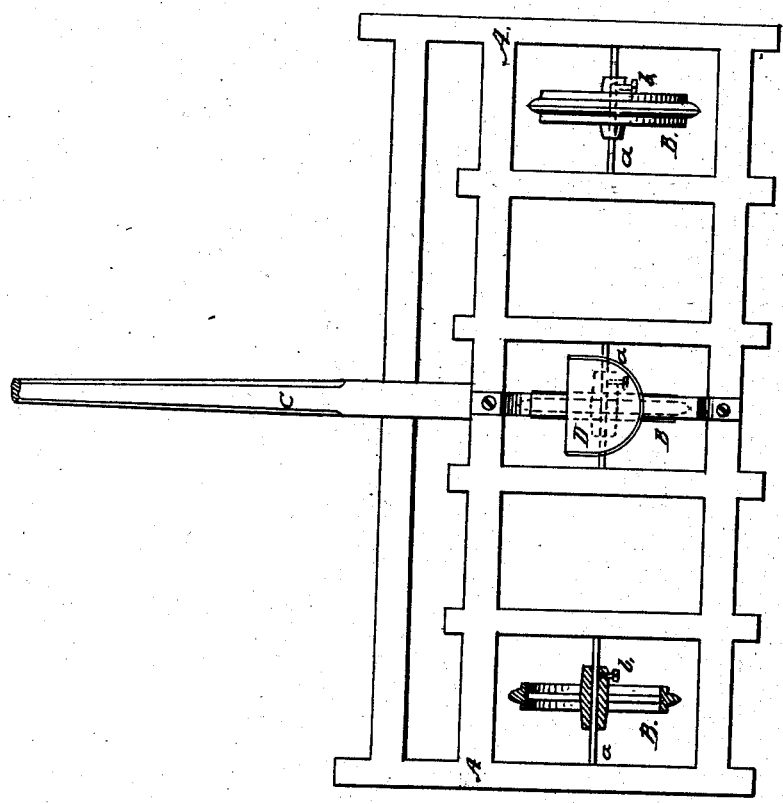

United States Patent Office.

JOHN M. CANTERBURY, OF MEXICO, MISSOURI.

Letters Patent No. 74,302, dated February 11, 1868.

---

IMPROVEMENT IN FIELD-MARKER.

---

The Schedule referred to in these Letters Patent and making part of the same.

---

TO ALL WHOM IT MAY CONCERN:

Be it known that I, JOHN M. CANTERBURY, of Mexico, in the county of Audrian, and State of Missouri, have invented a new and useful Improvement in Field-Marker; and I do hereby declare that the following is a full, clear, and exact description thereof, which will enable those skilled in the art to make and use the same, reference being had to the accompanying drawings, forming part of this specification, in which the drawings represents a plan of my improved revolving field-marker.

This invention relates to an improvement in the construction of a machine for marking rows for planting corn or other seed in field-culture, and consists in a wide and flat frame, within which is suspended a number of cast-iron wheels in such a manner that they can be adjusted to work at different distances apart, and mark rows of different width, as may be required; and also in forming the periphery in such a manner that the wheel shall not sink too deeply in the ground when the soil is wet and soft, as hereinafter more particularly described.

A A represent a wide frame, divided into spaces for suspending marking-wheels B B B on spindles $a\ a\ a$. The wheels will be made of cast iron, about two feet in diameter, with a rim about three inches wide, two and one-half inches deep. The middle of the perimeter will be made sharp, and bevelled on both sides, with a flange on each side, as shown sectionally in the drawing.

This form will make a distinctly-marked trench, with sloping sides, in the ground, when the wheel revolves, while the wheel will be upheld by the flanges, and cannot sink too deeply in the soil when soft. The number of the wheels may be varied.

For adjusting the wheels B B to different widths, they may be moved on the spindles $a\ a$ nearer together or further apart, and are held in any position by set-screws $b\ b$ through the hub. The frame A A is provided with a tongue, C, and a seat, D, for the driver; and the machine thus constructed is simple, cheap, and strong, and is very effective and durable in operation.

Having described my invention, I claim as new, and desire to secure by Letters Patent—

The cast-metal wheel B, having a sharp-bevelled perimeter, with square shoulders upon each side, when adjusted upon the spindle $a$, by means of the set-screw $b$ passing through the hub of said wheel, as herein shown and described.

JOHN M. CANTERBURY.

Witnesses:
  JOAB H. MITCHELL,
  WILLIAM M. SIMMS.